US006888659B2

(12) United States Patent
Allard (10) Patent No.: US 6,888,659 B2
(45) Date of Patent: May 3, 2005

(54) POLARIZATION CONTROLLER

(75) Inventor: Louis B. Allard, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 128 days.

(21) Appl. No.: 10/315,077

(22) Filed: Dec. 10, 2002

(65) Prior Publication Data

US 2004/0109233 A1 Jun. 10, 2004

(51) Int. Cl.$^7$ .......................... G02F 1/03; G02F 1/1347
(52) U.S. Cl. ....................... 359/246; 359/245; 359/238; 359/251; 349/80
(58) Field of Search ................. 359/246, 245, 359/238, 239, 240, 250, 251; 349/80, 97

(56) References Cited

U.S. PATENT DOCUMENTS

| | | | | |
|---|---|---|---|---|
| 4,389,090 A | | 6/1983 | LeFevre | 350/96 |
| 4,416,514 A | * | 11/1983 | Plummer | 349/80 |
| 4,979,235 A | | 12/1990 | Rumbaugh et al. | 455/616 |
| 5,005,952 A | | 4/1991 | Clark et al. | 350/335 |
| 5,212,743 A | | 5/1993 | Heismann | 385/11 |
| 5,788,632 A | * | 8/1998 | Pezzaniti et al. | 600/316 |
| 6,501,548 B1 | * | 12/2002 | Oldenbourg | 356/368 |

OTHER PUBLICATIONS

"Fiber Optic Interconnecting devices and passive components—basic test and measurement Procedures" Part 3–12: Examinations and measurements—Polarization dependence of Attenuation of a single–mode fibre optic component: Matrix calculation method: International Standard 61300–3–12 CEI International Electrotechnical Commission pp. 1–23.

* cited by examiner

*Primary Examiner*—Timothy Thompson
(74) *Attorney, Agent, or Firm*—Teitelbaum & MacLean; Neil Teitelbaum; Doug MacLean (57) ABSTRACT

A polarization controller comprising means for generating linearly polarized light and at least one liquid crystal cell. A preferred embodiment of the invention comprises a linear polarizer and two liquid crystal cells. In the preferred embodiment, the polarization direction of the polarizer and the orientation of the fast axis of the first and second liquid crystal cells are oriented in a manner that allows the linearly polarized light provided by the polarizer to be transformed into any state of polarization at the output of the second liquid crystal cell. The present invention provides full coverage of the Poincaré sphere.

15 Claims, 9 Drawing Sheets

PRIOR ART

PRIOR ART

POLARIZATION CONTROLLER

TECHNICAL FIELD

The present invention relates to polarization controllers and, in particular, to polarization controllers based on variable retardance retarders.

BACKGROUND OF THE INVENTION

The telecommunications industry has been working with polarization adjusters, controllers, and scramblers for many years. Typical uses include: optimizing optical power transmission through polarization dependent components; detecting polarization dependence of a component (by monitoring optical power at the output of the device while methodically scanning all the polarization states at the input of the component); and curtailing polarization dependence of components and detectors (by scanning substantially all possible states of polarization and illuminating the components and the detector at a rate faster than the signal sampling rate). Polarization controllers having endless control capabilities, which allow for reset free operation, are also in use in polarization mode dispersion compensators. Heismann teaches such an endless polarization controller in U.S. Pat. No. 5,212,743 issued May 18, 1993.

Various polarization control mechanisms employed by polarization controllers include rotatable fiber coils, fiber squeezers, variable orientation retarders, electro-optical waveguides and bulk devices with controllable retardance and optical axis orientation, and variable retardance retarders such as liquid crystal cells (LCC's). Polarization controllers based on LCC's are taught by Clark et al. in U.S. Pat. No. 5,005,952 issued Apr. 9, 1991, which discloses a stack of multiple liquid crystal cells. Rumbaugh et al. also teach a polarization controller in U.S. Pat. No. 4,979,235 issued Dec. 18, 1990, based on a stack of three liquid crystal cells.

LCC-based controllers are often used in feedback loops, in which they change the state of polarization in response to a signal. LCC-based controllers are designed to be able to transform any input state of polarization into any output state of polarization.

In the fields of test instrumentation and laboratory equipment, waveplate-based polarization controllers comprise a linear polarizer, a quarter waveplate and a half waveplate. A commercially available version of this polarization controller is manufactured by the JDS Uniphase Corporation under the PR2000™ product name. Rotatable fiber coils, taught by LeFevre in U.S. Pat. No. 4,389,090 issued Jun. 21, 1983, are also often used, but are cumbersome and do not always provide adequate repeatability. Furthermore, the slow response time and wavelength dependency of these polarization controllers require the user to schedule long duration tests and to make wavelength corrective approximations. Solid state opto-electrical waveguide devices are faster but are prone to drift problems. Fiber squeezers do not provide very reproducible results.

There is also a need in the field of test instrumentation for rapidly and reproducibly generating a fixed number of polarization states. This is a relatively easy task when the required states of polarization are linear. In this case a polarizer or a polarization prism can be mounted in a precise, motor-controlled goniometer. A specific application that could use a rapid and reproducible way to generate a fixed number of polarization states is the Mueller method for polarization dependent loss (PDL) measurement as described in the IEC document number CEI/IEC 61300-3-12:1997 incorporated herein by reference. This method requires the generation of four states of polarization with no more than three of the four states lying in a common plane in the Poincaré sphere representation. A common method of generating in a time sequence the four required states is to have a light source illuminate a circular polarizer providing circularly polarized light, and then to have three linear polarizers (0°, 45°, and 90°) sequentially disposed in the path of the circularly polarized light. One can also use the same polarizer mounted in a motor-controlled goniometer. Thus, one state of circularly polarized light and three states of linearly polarized light can be generated, and the PDL of a component measured. This mechanical toggling of the states of polarization is time consuming. A commercially available instrument based on the Mueller method for measuring PDL is manufactured by the JDS Uniphase Corporation under the PS3™ product name and requires approximately two seconds to complete one measurement.

Thus, there is a need for a polarization-controlling device that allows a relatively quick variation of the state of polarization of a light beam in a predictable and reproducible manner. Furthermore, for polarization controllers destined for the laboratory or the test bench, it may not be necessary to be able to transform an arbitrary input state of polarization into an arbitrary output state of polarization.

SUMMARY OF THE INVENTION

Accordingly, the present invention relates to a polarization controller comprising means for generating substantially linearly polarized light, and at least one variable retardance retarder.

Another feature of the present relates to a polarization controller comprising means for providing substantially linearly polarized light polarized along a polarization direction; a first variable retarder disposed for receiving light from the polarizer, said first variable retardance retarder having a first fast axis defining a first angle with said polarization axis; and, a second variable retarder disposed for receiving light from the first variable retardance retarder, said second variable retardance retarder having a second fast axis defining a second angle with said polarization axis.

The present invention also shows a method for imparting a light beam with a desired state of polarization, said method comprising the steps of:

a) passing a light beam through polarizing means to provide linearly polarized light polarized along a polarization axis, which is perpendicular to a propagation direction of the light;

b) passing the light beam through a first variable retardance retarder for modifying the state of polarization of the light beam received from the polarizer, said first variable retardance retarder having a first fast axis defining a first angle θ with said polarization axis; and c) passing the light beam through a second variable retardance retarder for modifying the state of polarization of the light beam received from the first variable retardance retarder to impart the desired state of polarization, said second variable retardance retarder having a second fast axis defining a second angle φ with said polarization axis.

DETAILED DESCRIPTION OF THE INVENTION

Figure 1:
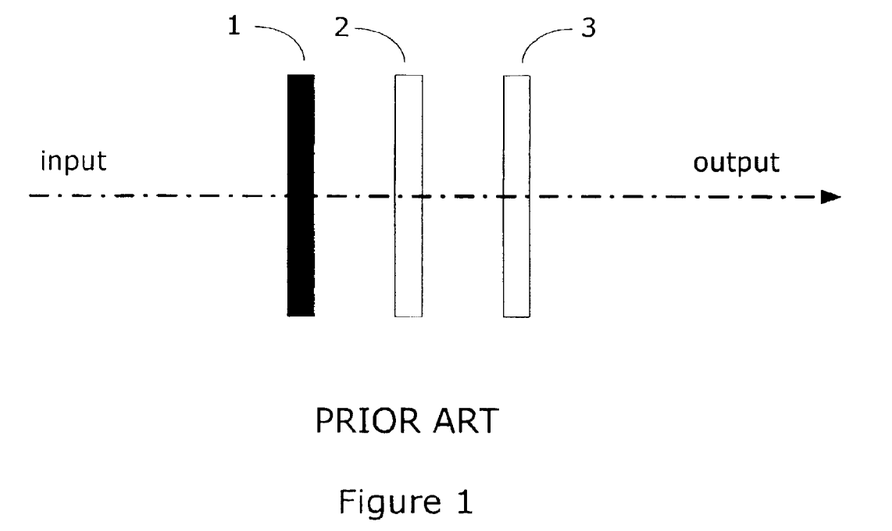
FIG. 1 is a schematic diagram of a prior art polarization controller based on a polarizer and two waveplates.

FIG. 1 shows a conventional prior art polarization controller comprising three rotatable elements: a polarizer 1, a quarter waveplate 2 and a half waveplate 3. The linearly polarized light emerging from the polarizer 1, described by a normalized Stokes vector $(1\ x_1\ x_2\ 0)^t$, where "t" denotes vector transposition, traverses the quarter waveplate 2 and emerges from it with a normalized Stokes vector of the form $(1\ y_1\ y_2\ s_3)^t$. The light at the output of the quarter waveplate 2 enters and traverses the half waveplate 3 and emerges from it with a normalized Stokes vector of the form $(1\ s_1\ s_2\ s_3)^t$. Assuming the waveplates have their nominal retardances at a same wavelength, then at that wavelength and with proper relative orientation of the fast axis of the quarter waveplate with the polarization axis of the polarizer and of the fast axis of the half waveplate with the polarization axis of the polarizer, one can generate all possible states of polarization at the output of the half waveplate. The mathematical expressions used in calculating the state of polarization at the output of a polarization controller comprising a polarizer, a quarter waveplate and a half waveplate follows. Without losing generality, let's assume the polarization angle of the polarizer is at an angle of 0°. In Mueller-Stokes formalism, the state of polarization at the output of the polarizer can be written as $$\text{Lin\_0}° = \begin{pmatrix} 1 \\ 1 \\ 0 \\ 0 \end{pmatrix}.$$

The Mueller matrix representation of a quarter waveplate disposed with its fast axis oriented at an angle $\alpha$ is $$QW(\alpha) = \begin{pmatrix} 1 & 0 & 0 & 0 \\ 0 & \cos^2(2\alpha) & \sin(2\alpha)\cos(2\alpha) & -\sin(2\alpha) \\ 0 & \sin(2\alpha)\cos(2\alpha) & \sin^2(2\alpha) & \cos(2\alpha) \\ 0 & \sin(2\alpha) & -\cos(2\alpha) & 0 \end{pmatrix},$$

and the mueller matrix representation of a half waveplate disposed with its fast axis oriented at an angle $\beta$ is $$HW(\beta) = \begin{pmatrix} 1 & 0 & 0 & 0 \\ 0 & \cos(4\beta) & \sin(4\beta) & 0 \\ 0 & \sin(4\beta) & -\cos(4\beta) & 0 \\ 0 & 0 & 0 & -1 \end{pmatrix}.$$

(A summary of Mueller matrix formalism can be found in *Polarized light in optics and spectroscopy* by Kliger et al., Boston, Academic Press, 1990.)

The output state of polarization of the polarization controller can thus be expressed as the normalized Stokes vector:

$$\begin{pmatrix} 1 \\ s_1 \\ s_2 \\ s_3 \end{pmatrix} = \begin{pmatrix} 1 & 0 & 0 & 0 \\ 0 & \cos(4\beta) & \sin(4\beta) & 0 \\ 0 & \sin(4\beta) & -\cos(4\beta) & 0 \\ 0 & 0 & 0 & -1 \end{pmatrix}.$$

$$\begin{pmatrix} 1 & 0 & 0 & 0 \\ 0 & \cos^2(2\alpha) & \sin(2\alpha)\cos(2\alpha) & -\sin(2\alpha) \\ 0 & \sin(2\alpha)\cos(2\alpha) & \sin^2(2\alpha) & \cos(2\alpha) \\ 0 & \sin(2\alpha) & -\cos(2\alpha) & 0 \end{pmatrix} \begin{pmatrix} 1 \\ 1 \\ 0 \\ 0 \end{pmatrix}.$$

Explicitly, the components of the normalized Stokes vector can be written as $s_1 = \cos(4\beta)\cos^2(2\alpha) + \cos(2\alpha)\sin(4\beta)\sin(2\alpha)$ $s_2 = \cos^2(2\alpha)\sin(4\beta) - \cos(4\beta)\cos(2\alpha)\sin(2\alpha)$ and $s_3 = -\sin(2\alpha)$.

Figure 2:
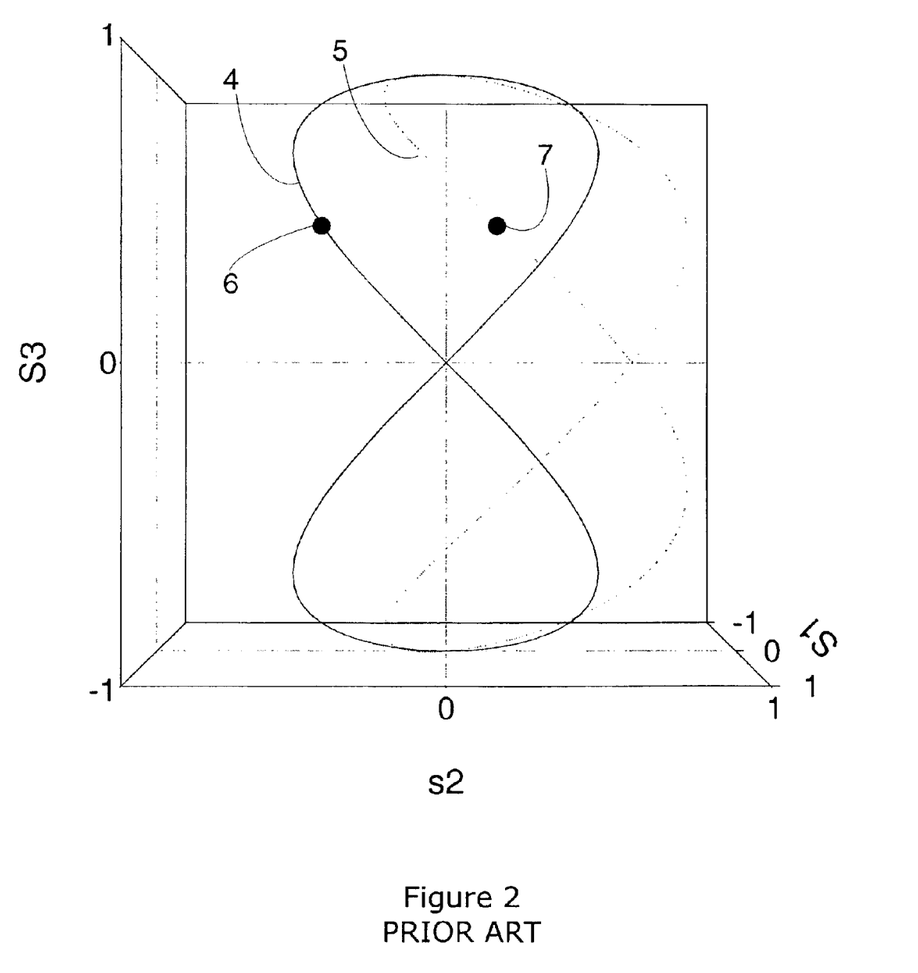
FIG. 2 illustrates the coverage of the Poincaré sphere with the prior art polarization controller of FIG. 1.

In FIG. 2 we see two three-dimensional parametric plot of $s_1$, $s_2$ and $s_3$. Trace 4 is obtained when the polarizer 1 and half waveplate 3 have their polarization axis and fast axis oriented at 0° while the quarter waveplate 2 is rotated through 180°. Trace 5 illustrates how the "figure-8" trace changes its position when the polarizer is unchanged and the half waveplate is fixed at an angle greater than 0° and less than 22.5°. The bottom and the top points on the "figure-8" traces are at the poles of the Poincaré sphere i.e. they correspond to left circular and right circular polarizations respectively. Illustratively, it is shown how the state of polarization at point 6 can be transformed into the state of polarization at point 7 by rotating the half waveplate. Thus, when the prior art polarization controller of FIG. 1 is operated at the wavelength where the waveplates have their nominal retardances, it is possible to generate all possible states of polarization. A problem occurs when the wavelength is such that the waveplates have less than their nominal retardances. It is then impossible for the "figure-8" traces of FIG. 2 to reach the poles of the Poincaré sphere i.e. the prior art polarization controller of FIG. 1 cannot generate all possible states of polarization for all wavelengths.

Figure 3:
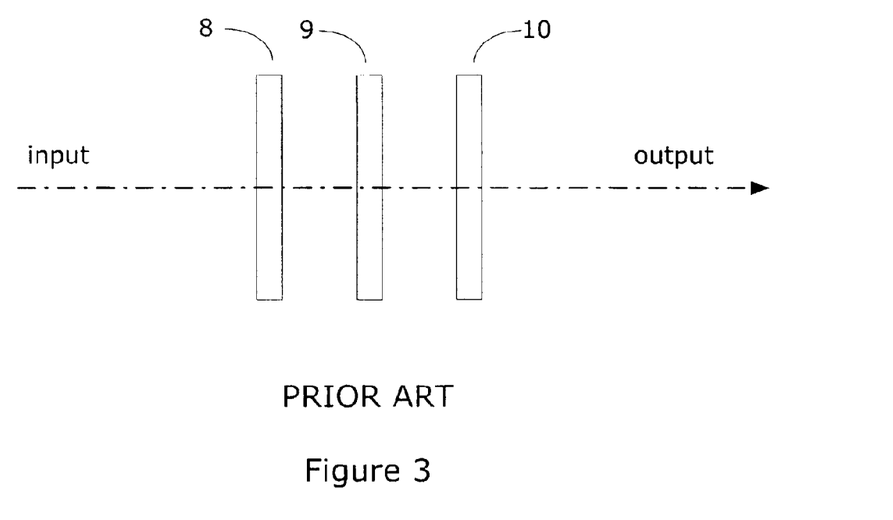
FIG. 3 is a schematic diagram of a prior art polarization controller based on three liquid crystal cells.

FIG. 3 shows another conventional polarization controller, which is disclosed in U.S. Pat. No. 4,979,235 issued Dec. 18, 1990, comprising three LCC's. LCC 8 and LCC 10 have their fast axes oriented at 45°, LCC 9 has its fast axis oriented at 0°. Not shown in FIG. 3 are the means for controlling the retardances of the LCC's. With this polarization controller the state of polarization at the input or at any point along the optical path is not known. Accordingly it is impossible to control the output state of polarization in a predictable way without a feedback signal of some sort. Consequently, a three LCC polarization controller (or for that matter, a multiple LCC polarization controller) is ill suited when accurate control of the output state of polarization is required.

Figure 4:
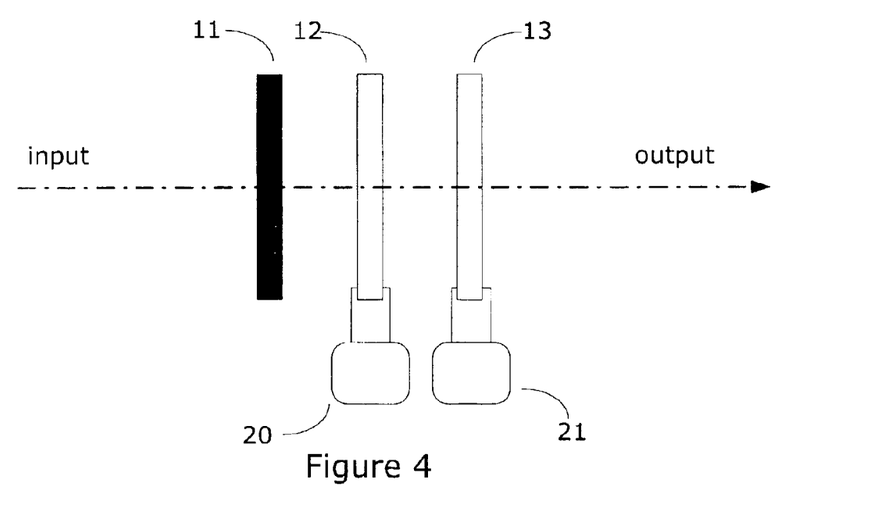
FIG. 4 is a schematic diagram of a preferred embodiment of the polarization controller according to the present invention.

FIG. 4 is related to a preferred embodiment of the present invention where no physical rotation of the elements is required. A polarizer 11 is disposed to receive light at an input, and to provide a stable state of linear polarization thereto. The polarization direction of the polarizer 11 is oriented at a predetermined angle to provide a desired linear polarization. A first LCC 12 with its fast axis at an angle of 45° from the polarization axis of the polarizer receives the light from the polarizer 11. A second LCC 13 with its fast axis at an angle of 0° to the polarization axis of the polarizer receives light from the LCC 12. The variable retardances of LCC 12 and LCC 13 are controlled by voltage sources 20 and 21. Let's consider the polarimetric output of the device when the retardances of each LCC are varied individually. This will illustrate how all states of polarization can be created at the output. First however, let's consider the Mueller matrix representation of variable retarder oriented at 0° and 45°. For the case where a variable retarder of retardance $\delta$ with its fast axis oriented at 0° we have $$VR\_0°(\delta) = \begin{pmatrix} 1 & 0 & 0 & 0 \\ 0 & 1 & 0 & 0 \\ 0 & 0 & \cos(\delta) & \sin(\delta) \\ 0 & 0 & -\sin(\delta) & \cos(\delta) \end{pmatrix}.$$

And for a variable retarder of retardance $\gamma$ with its fast axis oriented at 45° we have $$VR\_45°(\gamma) = \begin{pmatrix} 1 & 0 & 0 & 0 \\ 0 & \cos(\gamma) & 0 & -\sin(\gamma) \\ 0 & 0 & 1 & 0 \\ 0 & \sin(\gamma) & 0 & \cos(\gamma) \end{pmatrix}.$$

If we position the input polarizer with its polarization axis oriented at 45°, the Stokes vector at the output of the polarizer will be $$LIN\_45° = \begin{pmatrix} 1 \\ 0 \\ 1 \\ 0 \end{pmatrix}.$$

The output state of polarization, i.e. the output Stokes vector, of the preferred embodiment variable retarder polarization controller can thus be expressed as $$\begin{pmatrix} 1 \\ s_1 \\ s_2 \\ s_3 \end{pmatrix} = \begin{pmatrix} 1 & 0 & 0 & 0 \\ 0 & \cos(\gamma) & 0 & -\sin(\gamma) \\ 0 & 0 & 1 & 0 \\ 0 & \sin(\gamma) & 0 & \cos(\gamma) \end{pmatrix} \begin{pmatrix} 1 & 0 & 0 & 0 \\ 0 & 1 & 0 & 0 \\ 0 & 0 & \cos(\delta) & \sin(\delta) \\ 0 & 0 & -\sin(\delta) & \cos(\delta) \end{pmatrix} \begin{pmatrix} 1 \\ 0 \\ 1 \\ 0 \end{pmatrix}$$

Here, the components of the normalized Stokes vector can be written as $s_1 = \sin(\gamma)\sin(\delta)$ $s_2 = \cos(\delta)$ $s_3 = -\cos(\gamma)\sin(\delta)$.

Figure 5:
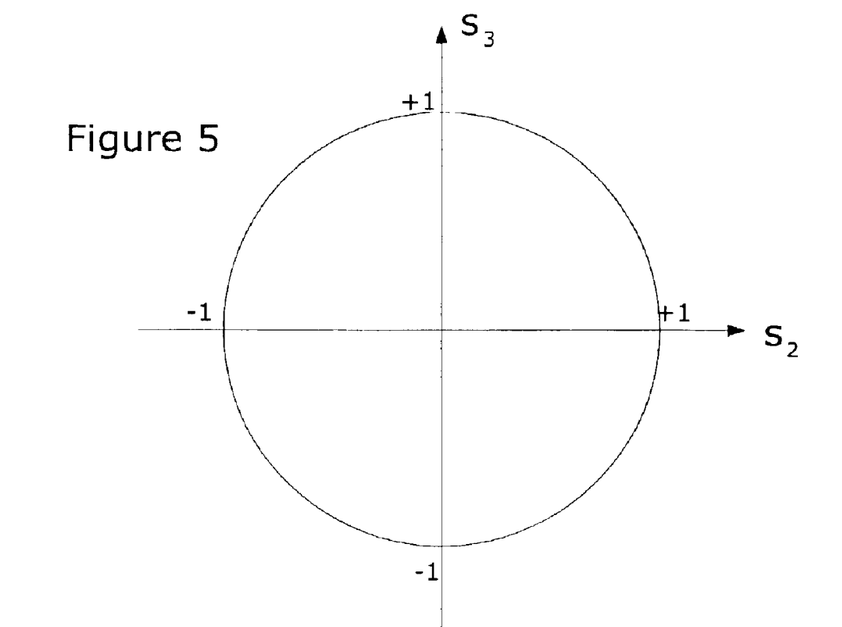
FIG. 5 illustrates a great circle traced in the $s_2$-$s_3$ plane of the Poincaré polarization representation.
Figure 6:
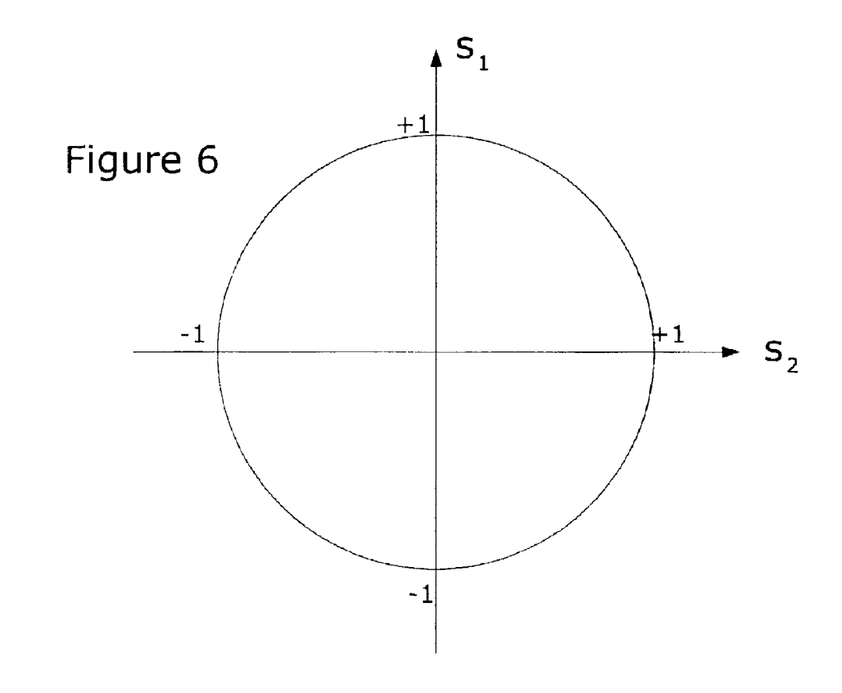
FIG. 6 illustrates a great circle traced in the $s_1$-$s_2$ plane of the Poincaré polarization representation.
Figure 7:
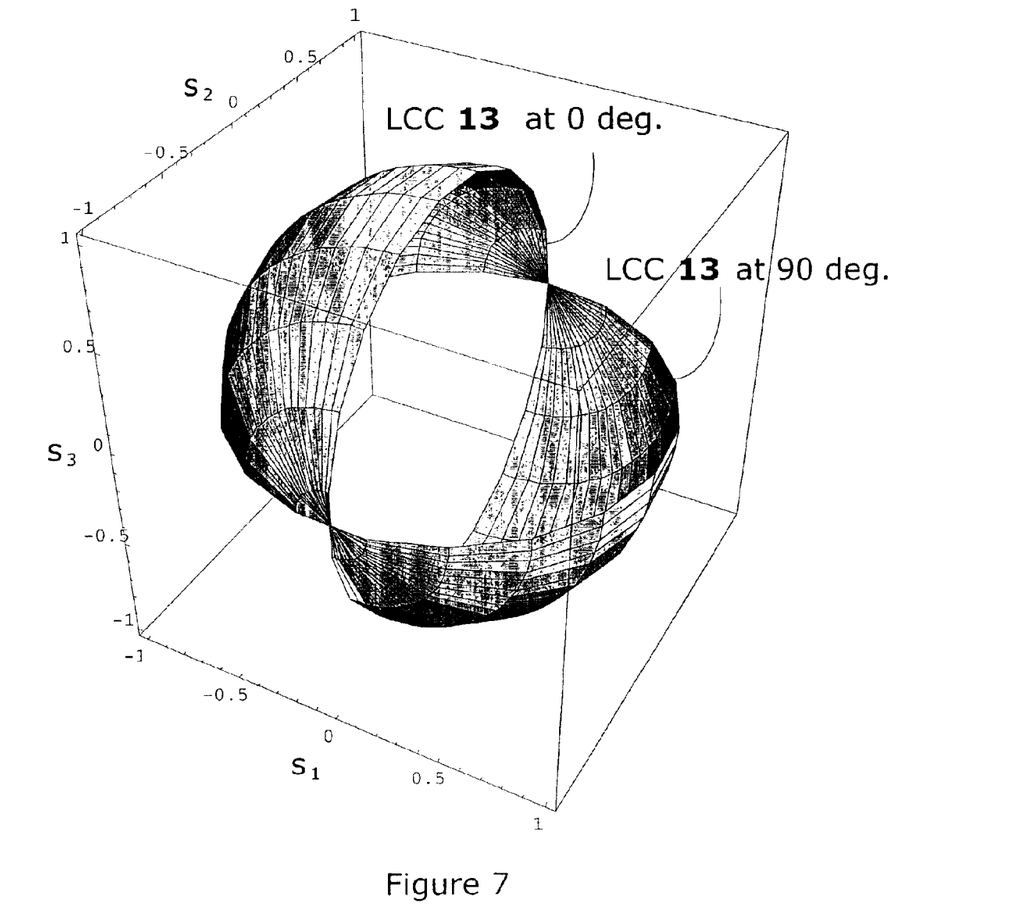
FIG. 7 is a parametric plot of the Stokes vector components at the output of the device of FIG. 4 for different operating conditions.

FIG. 5 shows a polarimetric plot of $s_2$ and $s_3$ for the output of the device shown in FIG. 4 as the retardance $\delta$ of LCC 12 is varied from $\theta$ to $\theta+360°$ ($\theta$ being an arbitrary retardance). Here, the polarizer's polarization axis is set at 45° and the retardance $\gamma$ of LCC 13 is fixed at N×180° (N=0,1,2, etc). In this case there is no polarization component along the $s_1$ axis. FIG. 6 shows the polarimetric output trace of the device of FIG. 4 as the retardance $\delta$ of LCC 12 is varied from $\theta$ to $\theta+360°$ with the polarizer's polarization axis set a 45° and the retardance $\gamma$ of LCC 13 fixed at 90°+N×180°. Here, there is no polarization component along the $s_3$ axis and only the $s_1$-$s_2$ plane is shown. Thus the effect of varying the retardance of LCC 12 from $\theta$ to $\theta+360°$ is to vary the output state of polarization such that it traces a great circle around the Poincaré sphere. The retardance of LCC 13 controls the inclination of the great circle with respect to the $s_3$ axis. FIG. 7 shows in three dimensions, consecutive traces of the output state of polarization of the device of FIG. 4 for 0° to 360° retardance sweeps of LCC 12 for LCC 13 having values of retardance varying between 0° and 90°. The Poincaré sphere coverage is complete when LCC 13 is varied between 0 and 180° (not shown). Thus Poincaré sphere full coverage is possible with this embodiment of the invention. Equivalent embodiments of the present invention are found the following combinations:

| Polarizer orientation | LCC 12 fast axis orientation | LCC 13 fast axis orientation |
|---|---|---|
| 45° | 0° | 45° |
| 45° | 90° | 45° |
| 45° | 0° | −45° |
| 45° | 90° | −45° |
| −45° | 0° | 45° |
| −45° | 90° | 45° |
| −45° | 0° | −45° |
| −45° | 90° | −45° |

Furthermore, it will be understood by one having ordinary skill in the art that the relative orientation between the polarizer and the LCC's is the important feature of the present invention.

Figure 8:
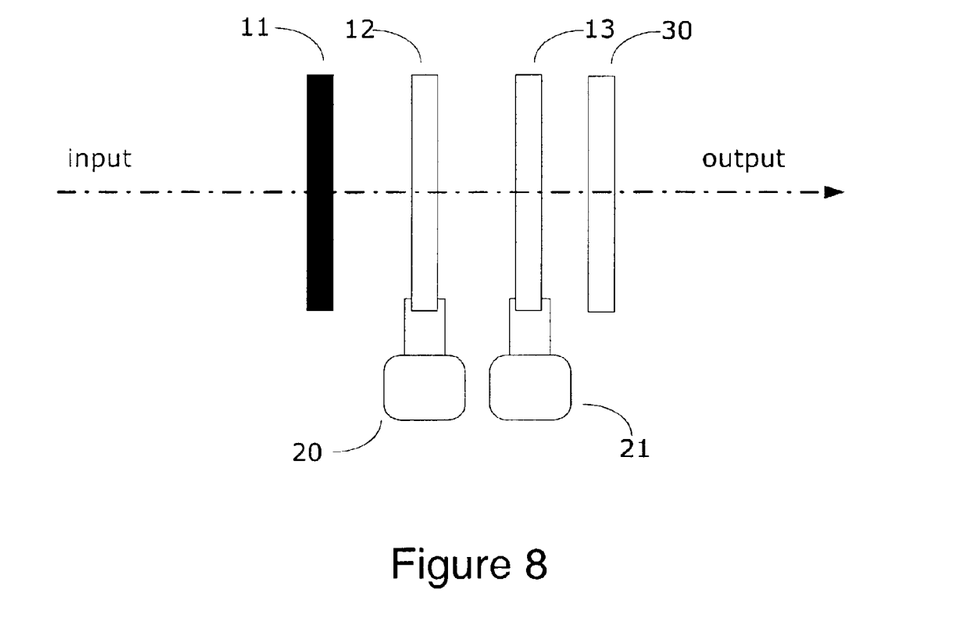
FIG. 8 is a schematic diagram of a preferred embodiment of the polarization controller according to the present invention.

LCC's can sometimes have an offset retardance that cannot be removed by applying a voltage. It may be necessary to remove that offset retardance and this can be achieved by disposing a fixed retardance retarder next to the LCC. The fast axes of the LCC and of the fixed retardance retarder are disposed at 90° to each other while the retardance of the fixed retardance retarder is chosen to compensate the LCC's offset retardance. Similarly, one may wish to operate a variable retarder polarization controller by applying voltages lying in a specific voltage range. The LCC can be rendered compatible with the desired voltage range by introducing a fixed retardance retarder in the optical path. FIG. 8 shows an embodiment of the present invention having a fixed retardance retarder 30 disposed next to LCC 13 with the fast axis of the fixed retardance retarder 30 oriented at 90° to the fast axis of LCC 13. The numerals 10, 12, 20 and 21 in FIG. 8 have the same description as the corresponding numerals of FIG. 4.

Figure 9A:
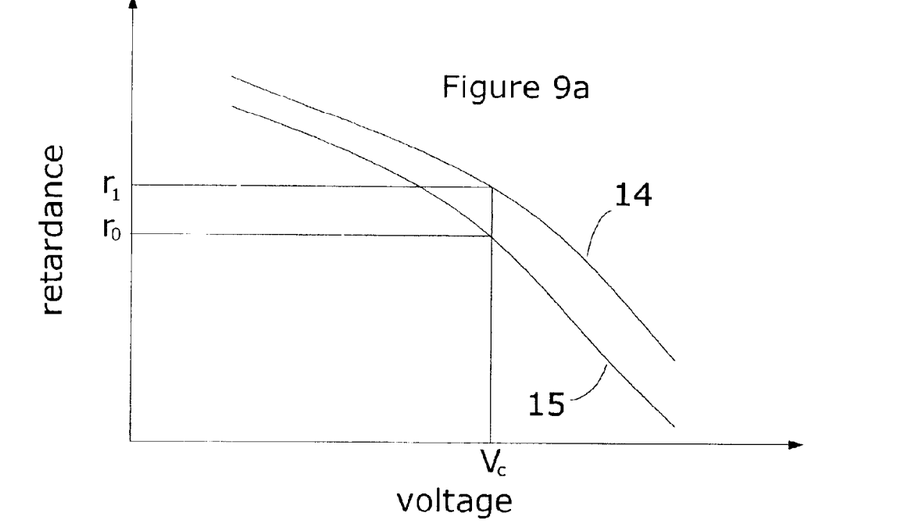
FIG. 9a is a graph of retardance versus voltage, which illustrates how a given liquid crystal cell can have its retardance profile displaced by the addition of a fixe retardance retarder in the optical path.

FIG. 9a shows two plots of retardance versus voltage. Plot 14 is for an LCC having a retardance $r_1$ at a voltage $V_c$ and plot 15 is for the same LCC to which a fixed retardance retarder has been adjoined thereby reducing the retardance to a value $r_0$ at the voltage $V_c$.

Figure 9B:
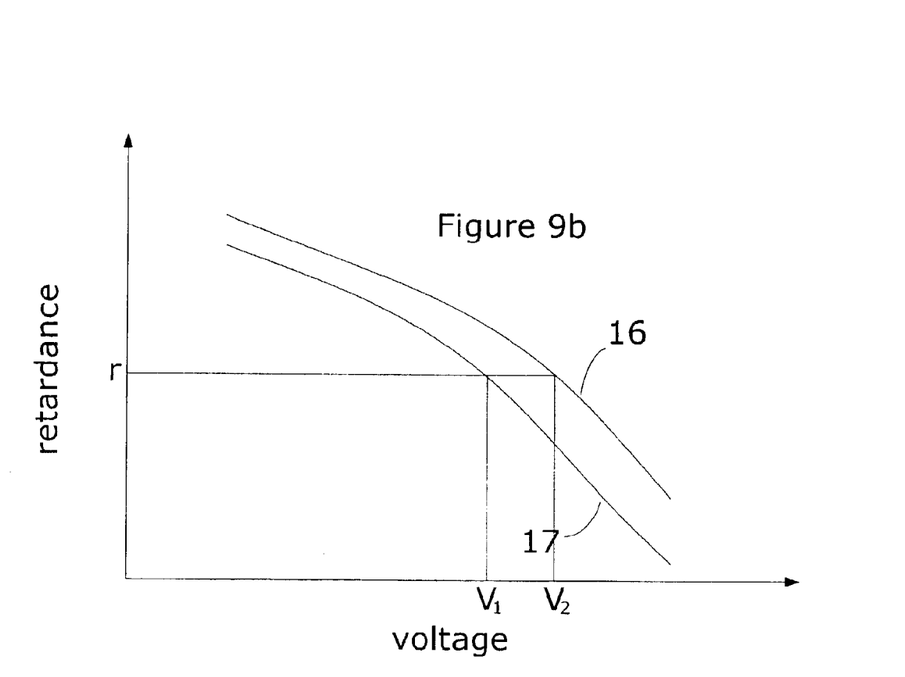
FIG. 9b is a graph of retardance versus voltage, which illustrates how a given liquid crystal cell will have a different retardance profile for different wavelengths.

The above description of the variable retardance polarization controller was for a given wavelength. If that wavelength is varied, one need only vary the voltage applied to the LCC's in order to compensate for that wavelength variation, provided, of course, that the above-mentioned retardance ranges are still possible at the new wavelength. FIG. 9b shows two plots of retardance versus voltage. Plot 16 is for an LCC operating at a wavelength $\lambda_1$ and plot 17 is for an LCC operating at a wavelength $\lambda_2$. From FIG. 9 one can see that the same retardance r can be reached at both wavelengths provided an adjustment is made in the applied voltage.

The preferred embodiment described above with the linear polarizer 11 disposed with its polarization axis oriented at 45°, the first LCC 12 disposed with its fast axis oriented at 0° and the second LCC 13 disposed with its fast axis oriented at 45°, can be used to generate four states of polarization for the measurement of PDL by the Mueller method. A set of four states adequate for the Mueller method of measuring PDL could be: (a) linearly polarized light at 0°, (b) linearly polarized light at 45°, (c) linearly polarized light at 90° and (d) left circularly polarized light. These four states can be generated by adjusting the retardances $RLCC_{12}$ and $RLCC_{13}$ of LCC 12 and LCC 13 respectively to the values: $RLCC_{12}=90°$ and $RLCC_{13}=90°$ for state (a), $RLCC_{12}=0°$ and $RLCC_{13}=0°$ for state (b), $RLCC_{12}=270°$ and $RLCC_{13}=90°$ for state (c) and $RLCC_{12}=90°$ and $RLCC_{13}=0°$ for state (d).

Figure 10:
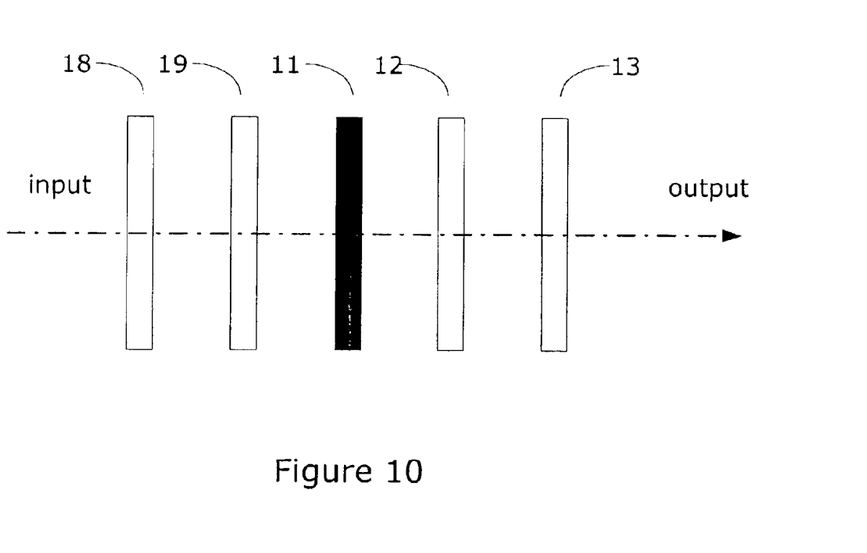
FIG. 10 is a schematic diagram of a polarization controller having two liquid crystal cells disposed at the input side according to the present invention; and, FIG. 11 is a schematic diagram of a bulk electro-optical waveplate.

Another embodiment of the present invention is shown in FIG. 10. Here, an LCC 18 having its fast axis at an angle of 0° with the polarization axis of the polarizer 11 and an LCC 19 having its fast axis at an angle of 45° with the polarization axis of the polarizer 11 are added to the preferred embodiment shown in FIG. 4. Although voltage sources are required to control the retardance of the LCC's, they are not shown in FIG. 10. The reason for placing LCC's 18 and 19 at the input side of the polarizer 11 is to be able to control the intensity of light at the output. For example, if the state of polarization of the light at the input side of FIG. 4 is linearly polarized orthogonally to the polarization axis of the polarizer 11, no light intensity can be detected at the output. The LCC's 18 and 19 of FIG. 10 can remedy to the situation by adjusting the input state of polarization in a way that will allow some light to traverse polarizer 11.

Figure 11:
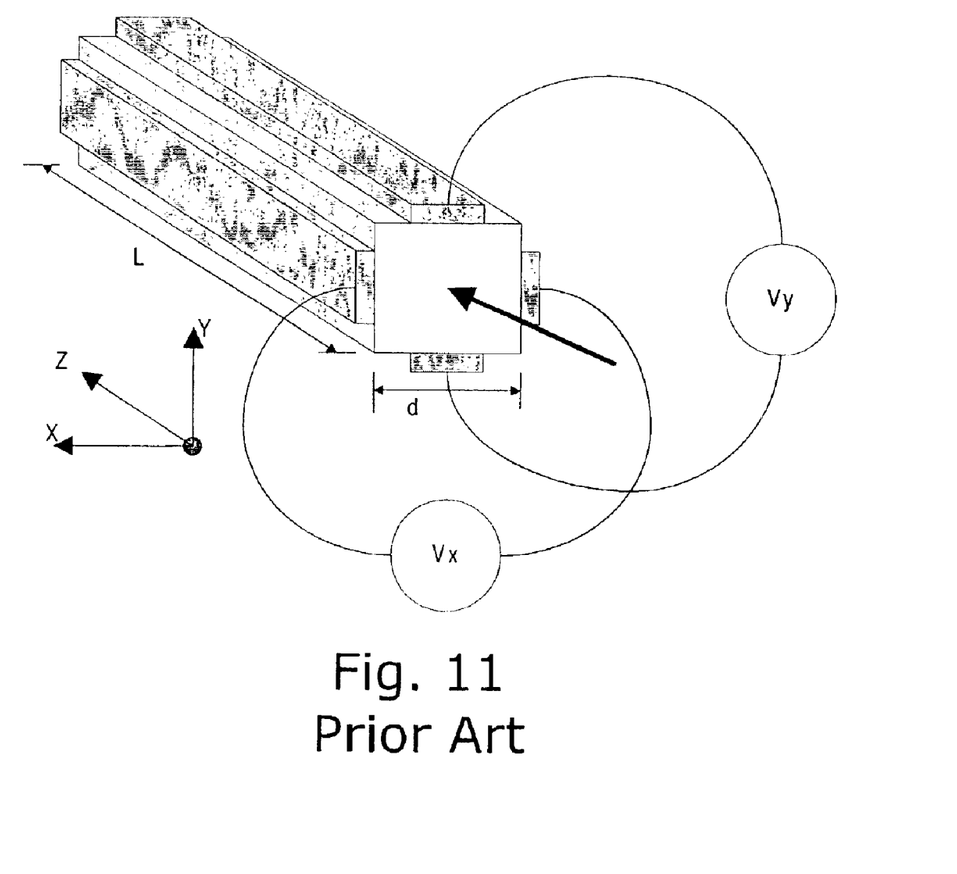

It would be possible to replace the LCC's of FIGS. 4 and 10 with other variable retardance retarders such as a bulk electro-optical material disclosed in U.S. Pat. No. 6,188,809 issued Feb. 13, 2001. In this case, not only the retardance would be variable but also the orientation of the fast axis. FIG. 11 depicts such a variable retardance, variable fast axis orientation waveplate. Here, light propagates in the z-axis direction of the electro-optical crystal having a length L and a square cross section of dimension d. Four electrodes applying two pairs of voltages control the retardance and the orientation of the fast axis.

What is claimed is:

1. A polarization controller for providing a beam of light with a desired state of polarization comprising:
  a) polarizing means for providing the light with a substantially linear state of polarization said light being polarized along a polarization axis, which is perpendicular to a propagation direction of the light;
  b) a first variable retardance retarder disposed to receive the light from the polarizer for modifying the state of polarization of said light, said first variable retardance retarder having a first fast axis defining a first angle θ with said polarization axis; and
  c) a second variable retardance retarder for modifying the state of polarization of the light received from the first variable retardance retarder to provide the desired state of polarization, said second variable retardance retarder having a second fast axis defining a second angle φ with said polarization axis.

2. A polarization controller as defined in claim 1, wherein the polarizing means is a polarizer.

3. A polarization controller as defined in claim 1 wherein θ is substantially equal to ±45°.

4. A polarization controller as defined in claim 1, wherein φ is substantially equal to 0° or 90°.

5. A polarization controller as defined in claim 1, wherein θ is substantially equal to ±45° and φ is substantially equal to 0° or 90°.

6. A polarization controller as defined in claim 2, wherein θ is substantially equal to ±45° and φ is substantially equal to 0° or 90°.

7. A polarization controller as defined in claim 1, wherein the polarizing means comprises at least one variable retardance retarder and a polarizer.

8. A polarization controller as defined in claim 1, wherein each of the first and second variable retardance retarders are liquid crystal cells.

9. A polarization controller as defined in claim 8, wherein each of the first and second variable retardance retarders includes electrodes for controlling the liquid crystal cells.

10. A polarization controller as defined in claim 5, wherein each of the first and second variable retardance retarders include liquid crystal cells.

11. A polarization controller as defined in claim 10, wherein each of the first and second variable retardance retarders includes electrodes for controlling the liquid crystal cells.

12. A polarization controller as defined in claim 8, additionally comprising at least one fixed retardance retarder for modifying the state of polarization of the light, to compensate for an offset retardance in the liquid crystal cell.

13. A method for imparting a light beam with a desired state of polarization comprising the steps of:
  a) passing a light beam through polarizing means to provide linearly polarized light polarized along a polarization axis, which is perpendicular to a propagation direction of the light;
  b) passing the light beam through a first variable retardance retarder for modifying the state of polarization of the light beam received from the polarizer, said first variable retardance retarder having a first fast axis defining a first angle θ with said polarization axis; and
  c) passing the light beam through a second variable retardance retarder for modifying the state of polarization of the light beam received from the first variable retardance retarder to impart the desired state of polarization, said second variable retardance retarder having a second fast axis defining a second angle φ with said polarization axis.

14. A method for measuring a polarization dependent loss of an optical element comprising the steps of:
 a) providing a light beam;
 b) imparting a desired state of polarization to the light beam according to the method of claim 13;
 c) measuring a transmission characteristic of the optical element with the light beam having the desired state of polarization;
 d) repeating steps (b) and (c) for three other states of polarization; and
 e) calculating a polarization dependent loss value in dependence upon the four measured transmission characteristics of the optical element;
 wherein, no more than three of the four states of polarization lie in a common plane in the Poincaré sphere representation of states of polarization.

15. A method for measuring a polarization dependent loss of an optical element as defined in claim 14, wherein the polarizing means comprises a polarizer; and wherein the variable retardance retarders include liquid crystal cells.

* * * * *